United States Patent
Oomori (10) Patent No.: US 8,674,646 B2
(45) Date of Patent: Mar. 18, 2014

(54) VEHICLE DISPLAY SYSTEM AND MOTOR CONTROL DEVICE THEREFOR

(75) Inventor: Kazuki Oomori, Obu (JP)

(73) Assignee: Denso Corporation, Kariya (JP)

(*) Notice: Subject to any disclaimer, the term of this patent is extended or adjusted under 35 U.S.C. 154(b) by 462 days.

(21) Appl. No.: 12/931,668

(22) Filed: Feb. 7, 2011

(65) Prior Publication Data

US 2011/0193508 A1 Aug. 11, 2011

(30) Foreign Application Priority Data

Feb. 8, 2010 (JP) ................................. 2010-025567
Sep. 6, 2010 (JP) ................................. 2010-199195

(51) Int. Cl.
*H02P 8/00* (2006.01)

(52) U.S. Cl.
USPC ....... 318/696; 318/685; 318/400.01; 318/721

(58) Field of Classification Search
USPC ............ 318/560, 685, 696, 400.01, 432, 466, 318/280, 266, 721, 599, 400.14, 400.15, 318/700, 799; 359/13, 267, 242, 277, 630, 359/633, 634, 872, 876, 877; 360/78.13; 396/244, 260
See application file for complete search history.

(56) References Cited

U.S. PATENT DOCUMENTS

| | | | | |
|---|---|---|---|---|
| 5,942,872 A | * | 8/1999 | Steger et al. | 318/696 |
| 6,121,744 A | * | 9/2000 | Hoda et al. | 318/685 |
| 6,731,092 B2 | * | 5/2004 | Shimazaki | 318/685 |
| 7,764,430 B2 | * | 7/2010 | Watanabe et al. | 359/630 |
| 2005/0162340 A1 | * | 7/2005 | Nagano et al. | 345/7 |
| 2006/0291066 A1 | * | 12/2006 | Shiobara et al. | 359/630 |
| 2008/0212196 A1 | | 9/2008 | Watanabe et al. | |

FOREIGN PATENT DOCUMENTS

| | | |
|---|---|---|
| JP | 9-311058 | 12/1997 |
| JP | 11-262297 | 9/1999 |
| JP | 2004-090713 | 3/2004 |
| JP | 2006-158019 | 6/2006 |
| JP | 2008-282025 | 11/2008 |

OTHER PUBLICATIONS

Office Action issued Nov. 20, 2012 in corresponding Korean Application No. 10-2011-10663 (with English translation).
Office action dated Dec. 20, 2011 in corresponding Japanese Application No. 2010-199195.

* cited by examiner

*Primary Examiner* — Antony M Paul
(74) *Attorney, Agent, or Firm* — Harness, Dickey & Pierce, PLC (57) ABSTRACT

A step motor and a motor control unit are connected to a battery, so that electrical power is continuously supplied to the step motor and the motor control unit. The motor control unit continuously drives the step motor until a rotor of the step motor reaches at a next excitation stable point, in a case that a display position adjusting switch or an ignition switch is turned off when the rotor of the step motor is on a way to the next excitation stable point.

11 Claims, 7 Drawing Sheets

VEHICLE DISPLAY SYSTEM AND MOTOR CONTROL DEVICE THEREFOR

CROSS REFERENCE TO RELATED APPLICATION

This application is based on Japanese Patent Applications No. 2010-025567 filed on Feb. 8, 2010, and No. 2010-199195 filed on Sep. 6, 2010, the disclosures of which are incorporated herein by reference.

FIELD OF THE INVENTION

The present invention relates to a display system for a vehicle and a motor control device for such display system, according to which an image is reflected by a mirror and the image is thereby displayed on a windshield of a vehicle (so called a head up display).

BACKGROUND OF THE INVENTION

According to one of known prior arts, for example, as disclosed in Japanese Patent No. 4309909, a head up display (also referred to as "HUD") system has a mirror for adjusting a display position and an electric motor for changing a reflection angle of the mirror. The electric motor is composed of, for example, a step motor.

As a driving system for the step motor, a full-step driving system and a micro-step driving system are known in the prior art. According to the micro-step driving system, an interval between neighboring iron teeth of a stator core of the step motor, that is an interval between neighboring excitation stable points, is formed as one step angle, and this step angle is divided into multiple micro angles. A rotor of the step motor is rotated for such micro angles. The micro-step driving system is applied to a driving motor for smoothly adjusting the display position of the image on the windshield.

The micro-step driving system can be applied to the step motor for the HUD system, according to which the image is faded out when an ignition key switch for a vehicle is turned off. In the HUD system, when a display position adjusting switch is turned on in order to adjust the display position of the image on the windshield, the rotor of the step motor moves from one excitation stable point to another (neighboring) excitation stable point.

Since the ignition key switch as well as the display position adjusting switch is turned off by a user (a vehicle driver) at any optional timing, the display position adjusting switch may be turned off when the rotor of the step motor is still on a way from one to the other excitation stable point. In such a case, a detent torque (a holding torque) is applied to the rotor of the step motor, and the rotor is attracted to either one of the excitation stable points. As a result, the display position of the image may be temporarily displaced.

In addition, the ignition key switch may be likewise turned off when the rotor of the step motor is on the way from one to the other excitation stable point, and power supply to the step motor is cut off. In such a case, the detent torque is likewise applied to the rotor of the step motor, and the rotor is attracted to either one of the excitation stable points. As a result, the display position of the image may be also temporarily displaced.

Furthermore, micro-step driving system can be applied to the step motor for the HUD system, according to which a quadrant of electrical degree of the step motor (which corresponds to an excitation stable point for the current rotor position) is memorized in a non-volatile memory device. In the HUD system, when the display position adjusting switch is turned on in order to adjust the display position of the image on the windshield, the rotor of the step motor moves from one excitation stable point to the other (neighboring) excitation stable point.

In the same manner to the above case, the display position adjusting switch may be turned off or the ignition key switch may be turned off to cut off the power supply to the step motor, during a period in which the rotor of the step motor is moving from one to the other excitation stable point. In such a case, the detent torque is likewise applied to the rotor of the step motor, and the rotor is attracted to either one of the excitation stable points. As a result, the quadrant of the electrical degree of the step motor, which may be displaced from the quadrant of the electrical degree corresponding to the excitation stable point of the current rotor position, may be memorized in the non-volatile memory device.

The quadrant of the electrical degree of the step motor, which is memorized in the non-volatile memory device, is used for driving the step motor in a next process for adjusting the display position. Therefore, the display position of the image may be displaced at starting the next process for adjusting the display position.

SUMMARY OF THE INVENTION

The present invention is made in view of the above problems. It is an object of the present invention to provide a vehicle display system and a motor control device thereof, according to which a display position of an image may not be even instantly displaced in a case that a display position adjusting switch or an ignition switch is turned off when a rotor of a step motor is on a way to a next excitation stable point.

It is another object of the present invention to provide a vehicle display system and a motor control device thereof, according to which a display position of an image may not be displaced at starting a next process for adjusting the display position, even in a case that a display position adjusting switch or an ignition switch is turned off when a rotor of a step motor is on a way to a next excitation stable point.

According to a feature of the present invention, for example, as defined in the appended claim 1, a vehicle display system has: a mirror for reflecting an image of a display device so as to display the image on a windshield of a vehicle; a step motor having a rotor provided with permanent magnets, the step motor changing a reflecting angle of the mirror when the rotor is rotated; a motor control unit for driving the step motor in a micro-step driving manner, wherein a step angle, of the step motor being divided into multiple micro step angles so that the rotor of the step motor is rotated by each micro step angle; and a display position adjusting switch.

In the vehicle display system, a display position of the image on the windshield is adjusted when the display position adjusting switch is turned on. The step motor as well as the motor control unit is connected to a battery of the vehicle, so that electrical power is continuously supplied to the step motor and the motor control unit. The motor control unit continuously drives the step motor until the rotor of the step motor reaches at a next excitation stable point, in a case that the display position adjusting switch or an ignition switch is turned off when the rotor of the step motor is on a way to the next excitation stable point.

According to the above feature, since the step motor and the motor control unit are connected to the battery, it is possible for the motor control unit to drive the step motor irrespectively of a condition of the display position adjusting switch or the ignition switch. Accordingly, even in the case that either one of the display position adjusting switch and the ignition switch is turned off, while the rotor of the step motor is on the way to the next excitation stable point, the motor control unit can continuously drive the step motor until the rotor of the step motor reaches at the next excitation stable point.

As a result, the rotor of the step motor can be surely moved to the next excitation stable point, even when the display position adjusting switch or the ignition switch is turned off. Therefore, the rotor of the step motor may not be attracted by the detent torque to either one of the excitation stable points. The display position of the image may not be even instantly displaced.

A quadrant of electrical degree of the step motor (which corresponds to the excitation stable point for the current rotor position) is memorized in a non-volatile memory device. The quadrant of electrical degree of the step motor is read out at starting a next process for adjusting the display position. Therefore, even if the display position adjusting switch or the ignition switch is turned off while the rotor of the step motor is on the way to the next excitation stable point, it becomes possible to reduce the cases in which the display position of the image may be displaced at starting the next process for adjusting the display position.

According to another feature of the present invention, for example, as defined in the appended claim 2, the motor control unit maintains a rotational speed of the rotor of the step motor at a speed, which corresponds to a rotational speed of the rotor when the display position adjusting switch or the ignition switch is turned off, until the rotor of the step motor reaches at the next excitation stable point, and the motor control unit maintains a rotational direction of the rotor of the step motor at a direction equal to that of the rotor at a time point at which the display position adjusting switch or the ignition switch is turned off.

According to such a feature, the rotational speed as well as the rotational direction of the step motor is maintained at the same speed and direction between before and after the display position adjusting switch or the ignition switch is turned off. Therefore, the image displayed on the windshield may not be even instantly displaced, or the image displayed on the windshield may not be displaced to an initial position before the display position adjusting switch or the ignition switch is turned off. Therefore, even when the rotor of the step motor is moved to the next excitation stable point, an uncomfortable feeling may not be given to eyes of the user (the vehicle driver).

According to a further feature of the present invention, for example, as defined in the appended claim 3, the motor control unit decreases a rotational speed of the rotor of the step motor to such a speed, which is lower than that of the rotor when the display position adjusting switch or the ignition switch is turned off, until the rotor of the step motor reaches at the next excitation stable point, and the motor control unit maintains a rotational direction of the rotor of the step motor at a direction equal to that of the rotor at a time point at which the display position adjusting switch or the ignition switch is turned off.

According to such a feature, the rotational direction of the step motor is maintained at the same direction between before and after the display position adjusting switch or the ignition switch is turned off. Therefore, the image displayed on the windshield may not be even instantly displaced, or the image displayed on the windshield may not be displaced to an initial position before the display position adjusting switch or the ignition switch is turned off. Therefore, even when the rotor of the step motor is moved to the next excitation stable point, an uncomfortable feeling may not be given to eyes of the user (the vehicle driver).

According to a still further feature of the present invention, for example, as defined in the appended claim 4, the motor control unit continuously drives the step motor until the rotor of the step motor reaches at the next excitation stable point, when the display position adjusting switch is turned off while the ignition switch is in ON condition.

According, to such a feature, the rotational speed of the step motor is maintained at the same speed or decreased to the lower speed in the same rotational direction between before and after the display position adjusting switch is turned off while the ignition switch is in the ON condition. Therefore, the image continuously displayed on the windshield may not be instantly displaced when the ignition switch is later on turned off, or the image displayed on the windshield may not be displaced to the initial position, when the ignition switch is afterwards turned off. Therefore, even when the rotor of the step motor is moved to the next excitation stable point, an uncomfortable feeling may not be given to eyes of the user (the vehicle driver).

According to a still further feature of the present invention, for example, as defined in the appended claim 5, the vehicle display system further has a brightness control unit, to which electrical power is continuously supplied from the battery when the ignition switch is turned off, and which gradually decreases display brightness of the image when the ignition switch is turned off.

The above brightness control unit may be realized together with the motor control unit or separately from the motor control unit.

According to a still further feature of the present invention, for example, as defined in the appended claim 6, a motor control device is applied to the vehicle display system, which may have any one of the features mentioned above.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENTS (First Embodiment)

A vehicle display system and a motor control device therefor according to a first embodiment of the present invention will be explained with reference to FIGS. 1 to 4. A display system 1 of the first embodiment is a so-called vehicle HUD system, according to which an image displayed by a display device 3 is reflected by a mirror 11 and the image is displayed on a windshield 4 of a vehicle. At first, an entire system including the display system 1 will be explained.

Figure 1:
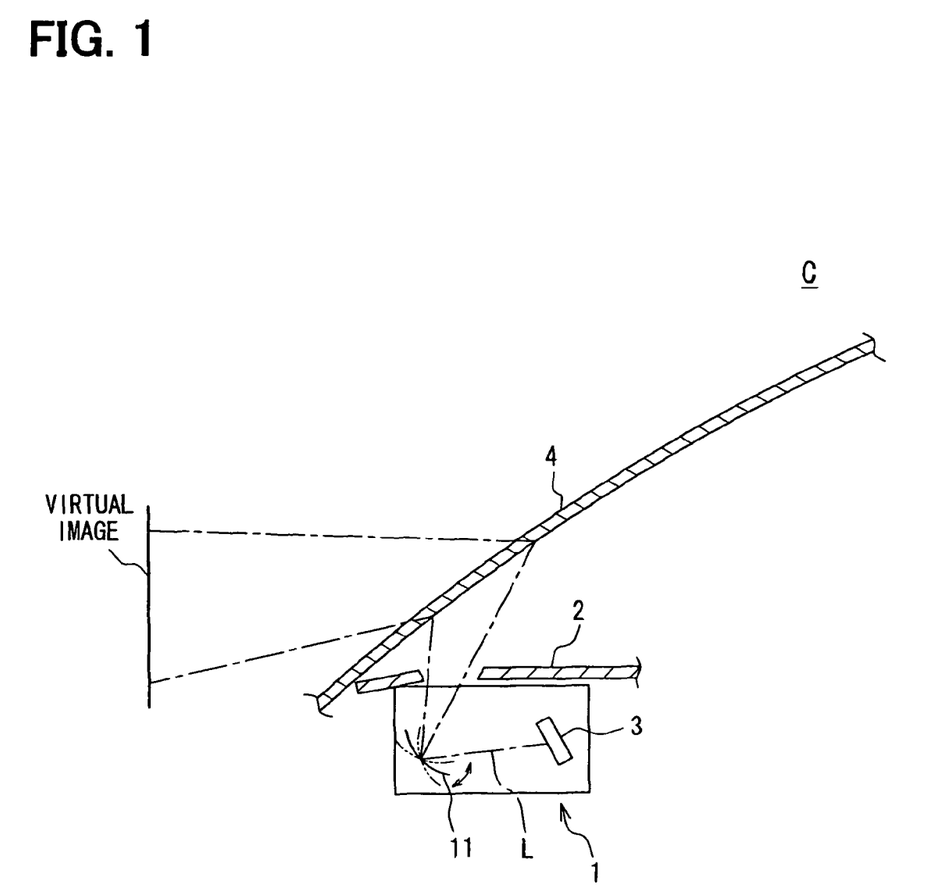
FIG. 1 is a schematic view showing an entire structure for a vehicle display system and a motor control device therefor according to a first embodiment of the present invention.
Figure 2:
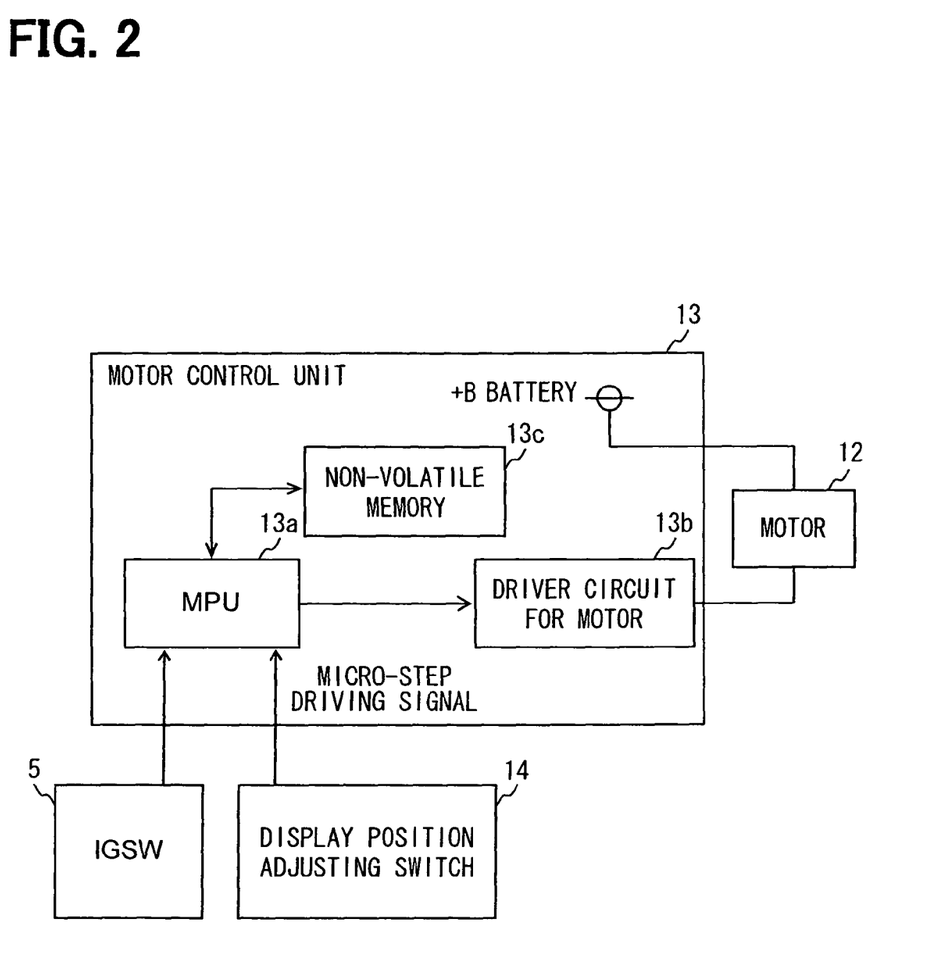
FIG. 2 is a block diagram of the motor control device according to the first embodiment.

As shown in FIGS. 1 and 2, the display system 1 is arranged in an instrument panel 2 of the vehicle C and composed of the mirror 11, a step motor 12, a motor control device (unit) 13, and a display position adjusting switch 14.

The display device 3 is composed of a known display device, for example, a liquid crystal display device having a backlight and arranged in the instrument panel 2. According to the present embodiment, the display device having the backlight is used. However, other types of display devices, such as an FE (a field emission) display, a florescent character display tube, an EL (an electroluminescent device) and so on may be used.

The mirror 11 is composed of, for example, a concave mirror and arranged in the instrument panel 2. The mirror 11 reflects display light L of the image displayed by the display device 3, so that the image is displayed on the windshield 4. The mirror 11 is rotatably supported in an inside space of the instrument panel 2, so that the mirror 11 is rotatable within a predetermined rotational range defined by a limiting member (not shown). As a result, the mirror 11 can change an angle of reflection for the display light L. Although the concave mirror is used in the present embodiment, the invention should not be accordingly limited. For example, a plane mirror may be used.

The step motor 12 is connected to a battery B, which is connected to various in-vehicle components mounted in the vehicle C and supplies electrical power to those in-vehicle components on a steady basis, so that the electrical power is continuously supplied to the step motor 12.

According to the present embodiment, as shown in FIG. 2, the step motor 12 is connected to the battery B via the motor control unit 13. However, the step motor 12 may be directly connected to the battery B. In this specification, the phrase "the battery B continuously supplies the electrical power" or "the electrical power is continuously supplied from the battery B" means that the battery B supplies the electrical power to the various in-vehicle components not only when an ignition switch 5 is turned on (including a condition in which an ACC (accessory) switch is turned on) but also even after the ignition switch 5 is turned off.

The step motor 12 is composed of, for example, a PM (permanent magnet) type step motor, which has a rotor (not shown) having a permanent magnet magnetized in a circumferential direction (having N pole(s) and S pole(s) in the circumferential direction). The step motor 12 further has a stator (not shown) having multiple iron teeth at an inner circumference, wherein the iron teeth are arranged at equal intervals in the circumferential direction and opposing to the rotor. In each of the iron teeth, a coil is wound to form an excitation coil. When electric current is allowed by the motor control unit 13 to flow through the excitation coil, the excitation coil is excited to N pole or S pole. On the other hand, when the electric current is not allowed by the motor control unit 13 to flow through the excitation coil, a detent torque (a holding torque) is generated, so that S pole and N pole of the rotor is attracted to the neighboring iron teeth and the rotor becomes stable at a position at which S pole and N pole of the rotor are opposed to the iron teeth. Accordingly, positions, at which the iron teeth are provided, are excitation stable points.

In the present embodiment, the PM type step motor is used as the step motor 12. However, the invention should not be accordingly limited. Another type of a step motor, such as a HB type step motor, a linear step motor and so on, which has a rotor having permanent magnets, may be likewise used.

The step motor 12 can change reflection angle of the mirror 11 by means of a transmitting member (not shown). More exactly, when the N pole (and the S pole) of the rotor of the step motor 12 moves from one excitation stable point to another excitation stable point, an output (a rotation) is generated at the step motor 12. The output (the rotational force) of the step motor 12 is transmitted to the mirror 11 by the transmitting member. The mirror 11 is rotated by the rotational force from the step motor 12, so as to change the reflection angle for the display light L. As a result that the reflection angle is changed, the image displayed on the windshield 4 moves in a vertical direction or in a horizontal direction to the vehicle driver sitting in a driving seat of the vehicle C.

In the present embodiment, the image displayed on the windshield 4 can be adjusted in the vertical direction to the vehicle driver sitting in the driver seat. However, the image may be adjusted in a horizontal direction or in both of the vertical and horizontal directions.

The motor control unit 13 is composed of an MPU 13a, a driver circuit 13b for the motor, and a non-volatile memory 13c, for example a flash memory. The motor control unit 13 is connected to the ignition switch (IGSW) 5, the step motor 12, the display position adjusting switch 14, and the battery B. Since the motor control unit 13 is connected to the battery B, the electric power is continuously supplied to the motor control unit 13, as in the same manner to the step motor 12.

The display position adjusting switch 14 is a switch for adjusting the display position of the image displayed on the windshield 4. The display position adjusting switch 14, which is composed of, for example, a well-known push-type switch, is arranged in a passenger compartment of the vehicle C. When the display position adjusting switch 14 is operated (pushed by the vehicle driver), a command signal is outputted to the motor control unit 13 (more exactly, the MPU 13a).

The ignition switch (IGSW) 5 is a well-known switch for starting an operation of an engine mounted in the vehicle C and arranged in the passenger compartment of the vehicle. When the ignition switch 5 is operated (turned on or turned off), a corresponding signal is likewise outputted to the motor control unit 13 (more exactly, the MPU 13a).

The MPU 13a is a well-known MPU which carries out various kinds of processes in accordance with programs memorized in the non-volatile memory device 13c. The MPU 13a is respectively connected to the non-volatile memory device 13c, the display position adjusting switch 14, the ignition switch 5, and the driver circuit 13b for the motor, so that the MPU 13a outputs a micro-step driving signal to the driver circuit 13b in accordance with inputted signals from the display position adjusting switch 14 and the ignition switch 5.

The driver circuit 13b is a well-known motor driver circuit being composed of multiple switching elements, and connected to the step motor 12. The driver circuit 13b controls electric current, which flows through the excitation coil of the step motor 12, in accordance with the micro-step driving signal from the MPU 13a.

The above micro-step driving signal will be further explained. The MPU 13a outputs the micro-step driving signal to the driver circuit 13b so that the step motor 12 is operated in a micro-step driving manner. According to the micro-step driving manner, one step angle (for example, 90 degrees in the present embodiment), which is defined by a number of iron teeth of the step motor 12, is divided into multiple micro angles, and the step motor 12 is rotated by the micro angle. According to the present embodiment, one step angle is divided into five micro angles. The number of division for the micro angles may be changed. The larger the number of division becomes, the more smoothly the step motor 12 can be operated.

During a period that the ignition switch 5 is turned on (until the ignition switch 5 is turned off), namely during an operation of the engine of the vehicle, when the command signal (ON signal) is inputted from the display position adjusting switch 14 to the MPU 13a, the MPU 13a reads out a quadrant of electrical degree of the step motor 12 (which corresponds to the excitation stable point for the current rotor position) from the non-volatile memory device 13c. And so long as the command signal is inputted from the display position adjusting switch 14 to the MPU 13a, the MPU 13a outputs the micro-step driving signal to the driver circuit 13b, so that the step motor 12 is continuously operated. Then, the rotor of the step motor 12 is moved from the excitation stable point, which is read out from the non-volatile memory device 13c and which corresponds to the quadrant of electrical degree of the step motor 12, to a first neighboring excitation stable point. The rotor of the step motor 12 is further moved from the first neighboring excitation stable point to a second neighboring excitation stable point, which is next to the first neighboring excitation stable point. As above the rotor is moved from one excitation stable point to the next excitation stable point, and the rotor is thus rotated. In the case that the display position adjusting switch 14 is turned off when the rotor of the step motor 12 reaches at one of the excitation stable points, the MPU 13a memorizes in the non-volatile memory device 13c the quadrant of electrical degree of the step motor 12 corresponding to the excitation stable point.

The display position adjusting switch 14 and the ignition switch 5 is turned off by the user at any optional timing. Therefore, it is not always the case that the display position adjusting switch 14 or the ignition switch 5 is turned off when the rotor of the step motor 12 has reached at one of the excitation stable points. In other words, the display position adjusting switch 14 or the ignition switch 5 may be turned off when the rotor of the step motor 12 is on a way from one to the other excitation stable point. In such a case, as already explained above, the display position of the image may be temporarily displaced, or the display position of the image may be displaced at starting the next process for adjusting the display position.

According to the present embodiment, however, the step motor 12 as well as the motor control unit 13 is connected to the battery B, so that the electric power is continuously supplied to the step motor 12 and the motor control unit 13. In addition, the motor control unit 13 (the MPU 13a) continuously drives the step motor 12 until the rotor of the step motor 12 reaches at the next excitation stable point, if at least one of the display position adjusting switch 14 and the ignition switch 5 is turned off during the period in which the rotor of the step motor 12 is moving from one of the excitation stable point to the next (neighboring) excitation stable point.

As above, the rotor of the step motor 12 is continuously operated until the rotor reaches at the next excitation stable point, even when either one of the display position adjusting switch 14 and the ignition switch 5 is turned off when the rotor of the step motor 12 is on the way to the next excitation stable point. Therefore, it can be avoided that the rotor is attracted by the detent torque to either one of the excitation stable points, to thereby decrease the cases in which the display position of the image may be temporarily displaced.

In addition, the quadrant of electrical degree of the step motor 12 (which corresponds to the excitation stable point for the actual rotor position) can be memorized in the non-volatile memory device 13c, even in the case that either one of the display position adjusting switch 14 and the ignition switch 5 is turned off while the rotor of the step motor 12 is on the way to the next excitation stable point. Therefore, it is possible to decrease the cases in which the display position of the image may be displaced at starting the next process for adjusting the display position.

An operation of the vehicle display system 1 (more exactly, the motor control unit 13) will be explained with reference to FIG. 3, in the case that the display position adjusting switch 14 is turned off while the rotor of the step motor 12 is on the way to the next excitation stable point.

Figure 3:
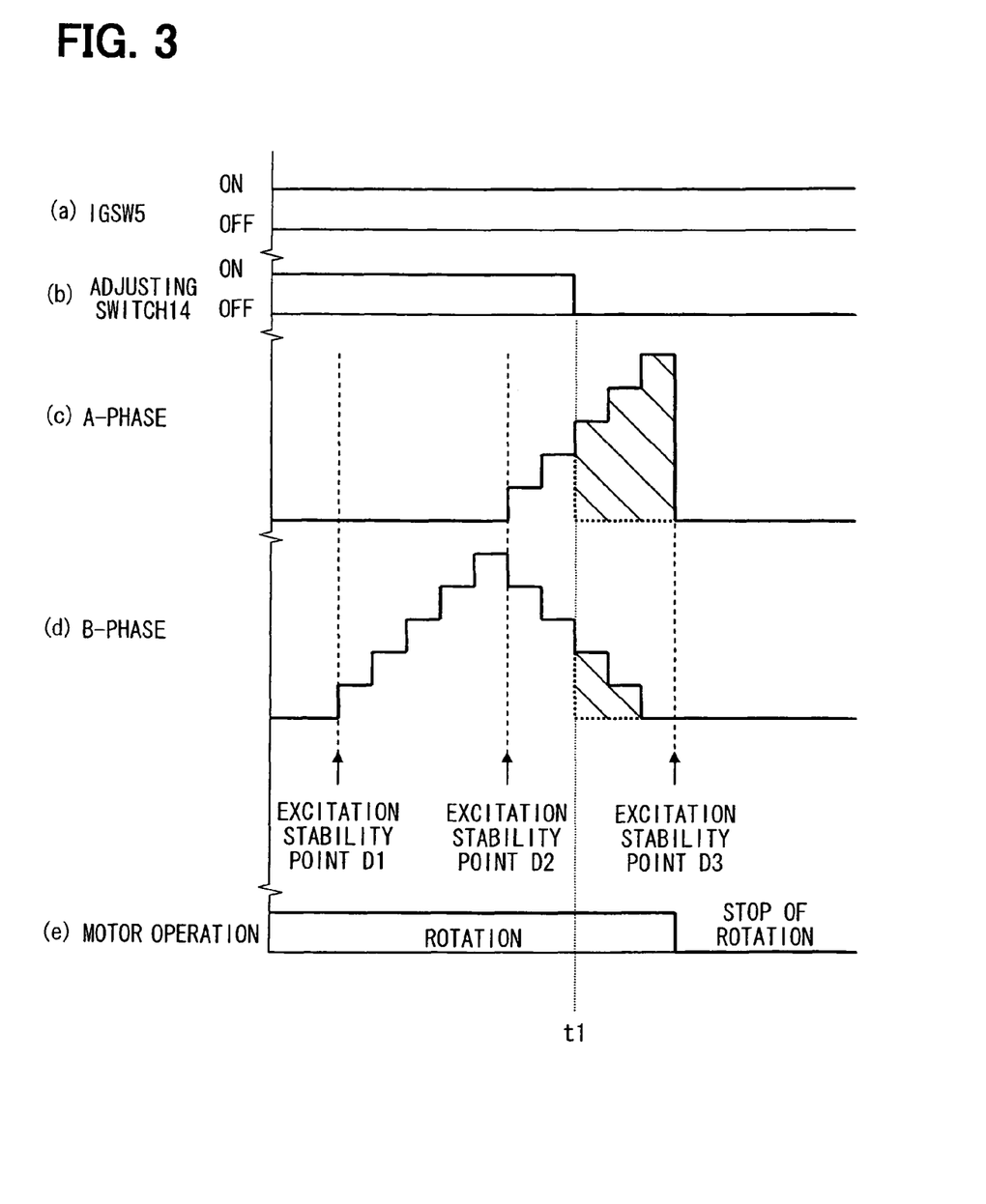
FIG. 3 is a timing chart showing an operation of the first embodiment when a display position adjusting switch is turned off.

As shown in (b) to (d) of FIG. 3, the display position adjusting switch 14 is turned off at a time point t1, at which the rotor of the step motor 12 is on the way from the excitation stable point D2 to the next excitation stable point D3.

According to the conventional micro-step driving system, at the time point t1, the motor control unit stops outputting the micro-step driving signal. Therefore, the stator of the step motor 12 becomes in a non-excitation condition and thereby the rotor of the step motor 12 is rapidly attracted by the detent torque to either one of the excitation stable points D2 and D3. As a result, as already explained above, the display position of the image may be temporarily displaced or the display position of the image may be displaced at starting the next process for adjusting the display position.

According to the present embodiment, however, as shown in (c) and (d) of FIG. 3, the motor control unit 13 continues to output the micro-step driving signal even after the time point t1, until the rotor of the step motor 12 reaches at the next excitation stable point D3. Accordingly, the present embodiment can solve the problem of the conventional micro-step driving system.

An operation of the vehicle display system 1 (more exactly, the motor control unit 13) will be explained with reference to FIG. 4, in the case that the ignition switch 5 is turned off while the rotor of the step motor 12 is on the way to the next excitation stable point.

Figure 4:
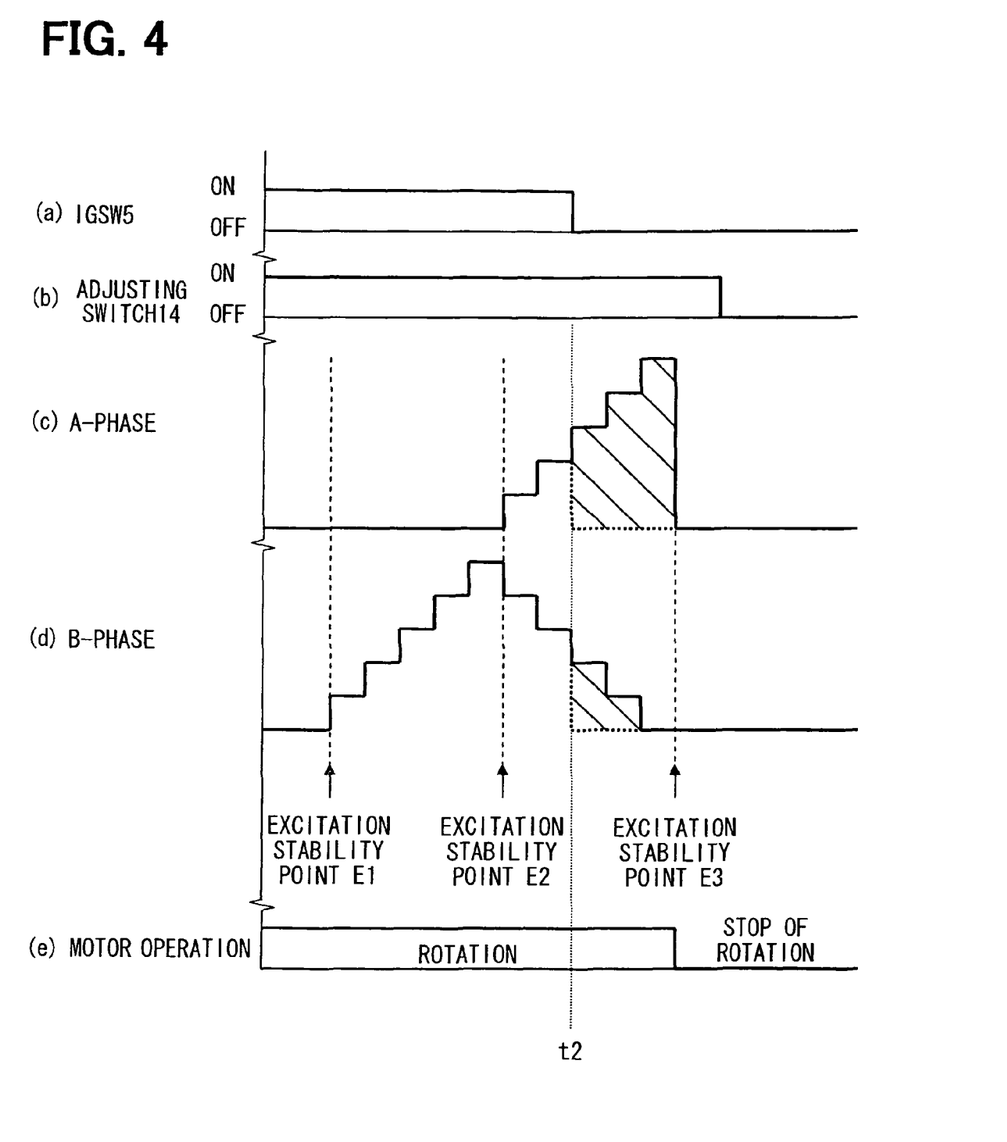
FIG. 4 is a timing chart showing an operation of the first embodiment when an ignition switch is turned off.

As shown in (a), (c) to (d) of FIG. 4, the ignition switch 5 is turned off at a time point t2, at which the rotor of the step motor 12 is on the way from the excitation stable point E2 to the next excitation stable point E3.

According to the conventional micro-step driving system, at the time point t2, the motor control unit stops outputting the micro-step driving signal. Therefore, the stator of the step motor 12 becomes in a non-excitation condition and thereby the rotor of the step motor 12 is rapidly attracted by the detent torque to either one of the excitation stable points E2 and E3. As a result, as already explained above, the display position of the image may be temporarily displaced or the display position of the image may be displaced at starting the next process for adjusting the display position.

According to the present embodiment, however, as shown in (c) and (d) of FIG. 4, the motor control unit 13 continues to output the micro-step driving signal even after the time point t2, until the rotor of the step motor 12 reaches at the next excitation stable point E3. Accordingly, the present embodiment can solve the problem of the conventional micro-step driving system.

(Second Embodiment)

Now, a second embodiment of the present invention will be explained with reference to FIGS. 5A and 5B.

Figure 5A:
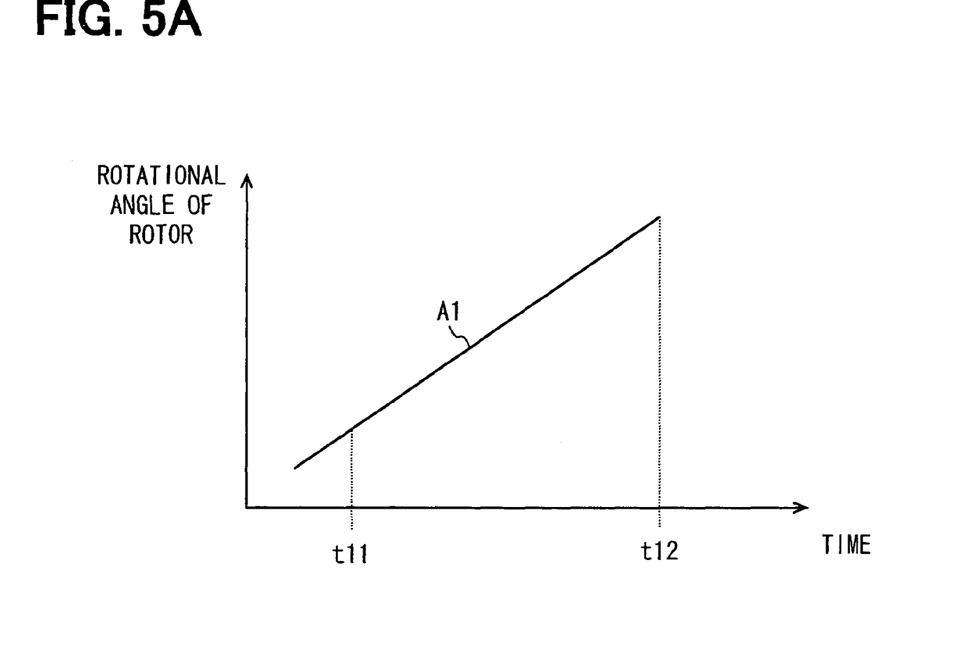
FIG. 5A is a graph showing a relation between a rotational angle of a rotor and a time according to a second embodiment of the present invention.

FIG. 5A is a graph showing a relation between the rotational angle of the rotor of the step motor 12 and the time according to the second embodiment of the present invention. FIG. 5B is a graph showing a relation between the rotational speed of the rotor of the step motor 12 (that is, a changing ratio of the rotational angle with respect to the time) and the time according to the second embodiment. A time point t11 in FIGS. 5A and 5B corresponds to the time point t1 of FIG. 3. A time point t12 in FIGS. 5A and 5B means a time point, at which the rotor of the step motor 12 has reached at the excitation, stable point D3, in other words, the electrical degrees of A phase and B phase of the step motor 12 have reached at such electrical degrees corresponding to the excitation stable point D3.

During the period that the ignition switch 5 is turned on (until the ignition switch 5 is turned off), when the command signal (ON signal) is inputted from the display position adjusting switch 14 to the MPU 13a, the motor control unit 13 (more exactly, the MPU 13a) reads out the quadrant of electrical degree of the step motor 12 (which corresponds to the excitation stable point for the current rotor position) from the non-volatile memory device 13c. And so long as the command signal is inputted from the display position adjusting switch 14 to the MPU 13a, the MPU 13a outputs the micro-step driving signal to the driver circuit 13b, so that the step motor 12 is continuously operated. Then, the rotor of the step motor 12 is moved from the excitation stable point, which is read out from the non-volatile memory device 13c and which corresponds to the quadrant of electrical degree of the step motor 12, to a first neighboring excitation stable point. The rotor of the step motor 12 is further moved from the first neighboring excitation stable point to a second neighboring excitation stable point, which is next to the first neighboring excitation stable point. As above the rotor is continuously moved from one excitation stable point to the next excitation stable point, and the rotor is thus rotated.

When the display position adjusting switch 14 is turned off at the time point t11, at which the rotor of the step motor 12 is on the way to the next excitation stable point, the MPU 13a continues to output the micro-step driving signal to the driver circuit 13b by the time point t12, at which the rotor of the step motor 12 reaches at the next excitation stable point D3. In the above operation, the MPU 13a keeps a rotational speed of the rotor of the step motor 12 at such a speed, which corresponds to the rotational speed of the rotor at the time point t11, namely at, the time point when the display position adjusting switch 14 is turned off. In other words, the MPU 13a continuously outputs the micro-step driving signal to the driver circuit 13b at such a time interval, which is equal to that at the time point when the display position adjusting switch 14 is turned off.

When the rotor of the step motor 12 reaches at the excitation stable point D3, the MPU 13a memorizes in the non-volatile memory device 13c the quadrant of electrical degree of the step motor 12 corresponding to the excitation stable point D3.

Figure 5B:
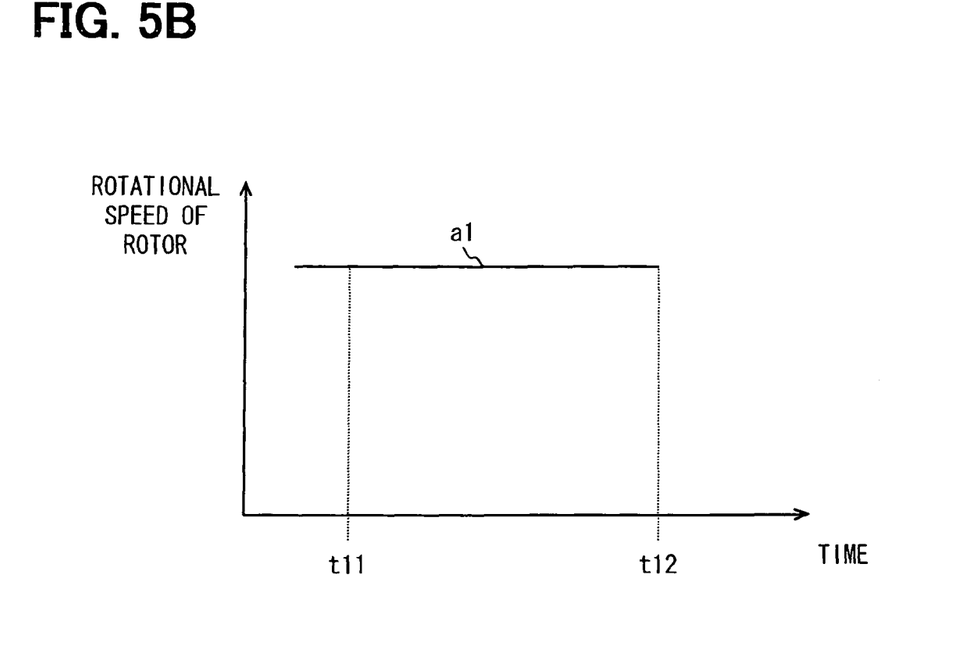
FIG. 5B is a graph showing a relation between a rotational speed of the rotor (that is, a changing ratio of the rotational angle with respect to the time) and a time according to the second embodiment.

Since the motor control unit 13 operates the step motor 12 as above, the changing ratio of the rotational angle of the rotor with respect to the time between the time point t11 and the time point t12 is controlled at such a value, which is equal to that before the time point t11, as shown in FIGS. 5A and 5B. Namely, the rotational speed of the rotor (that is, the changing ratio of the rotational angle) is controlled to be constant.

As explained above, according to the second embodiment, when the display position adjusting switch 14 is turned off (at the time point t11) while the ignition switch 5 is maintained in the ON condition, the step motor 12 is continuously operated until the rotor of the step motor 12 reaches at the next excitation stable point D3. In addition, the rotational speed of the rotor at the time point t11 (at which the display position adjusting switch 14 is turned off) is maintained, and the rotor is rotated in the same direction to that of the rotation at the time point t11.

As above, the rotational speed as well as the rotational direction of the rotor of the step motor 12 is maintained at the same speed and direction between the cases before and after the display position adjusting switch 14 is turned off. Accordingly, the image continuously displayed on the windshield may not be instantly displaced, when the display position adjusting switch 14 is turned off while the ignition switch 5 is in the ON condition. Furthermore, the image continuously displayed on the windshield may not be displaced to an initial position before the display position adjusting switch 14 is turned off. Therefore, even when the rotor of the step motor 12 is continuously moved to the next excitation stable point, an uncomfortable feeling may not be given to eyes of the user (the vehicle driver).

(Third Embodiment)

According to a third embodiment of the present invention, when the display position adjusting switch 14 is turned off while the ignition switch 5 is maintained in the ON condition, the step motor 12 is likewise continuously operated until the rotor of the step motor 12 reaches at the next excitation stable point D3. In addition, the rotational speed of the rotor at the time point t1 (at which the display position adjusting switch 14 is turned off) is decreased, and the rotor is rotated in the same direction to that of the rotation at the time point t1.

Now, the third embodiment of the present invention will be explained with reference to FIGS. 6A and 6B.

Figure 6A:
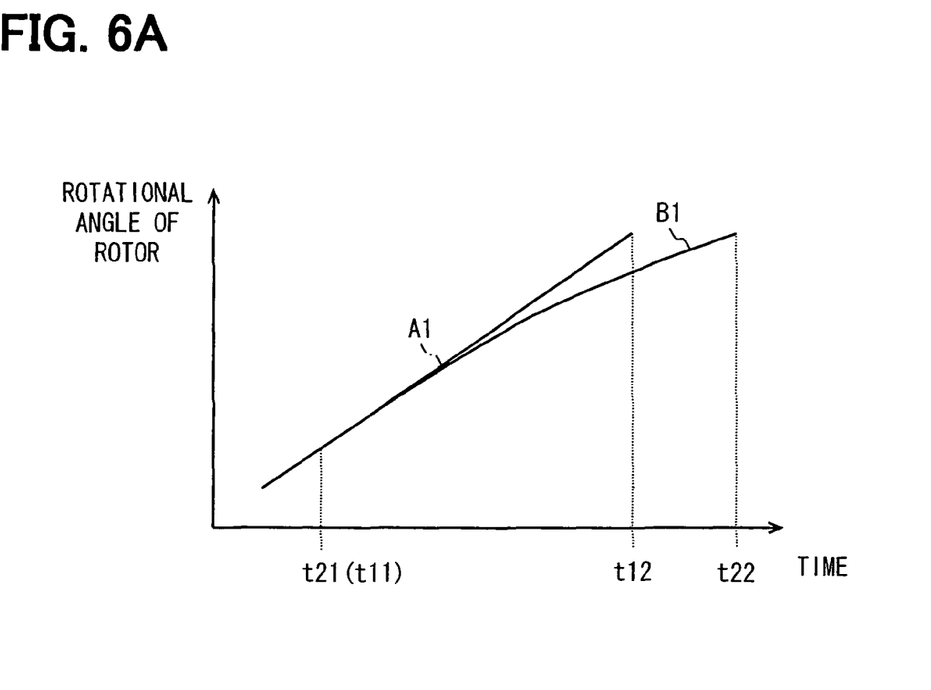
FIGS. 6A and 6B are graphs according to a third embodiment of the present invention, each of which corresponds to FIGS. 5A and 5B.
Figure 6B:
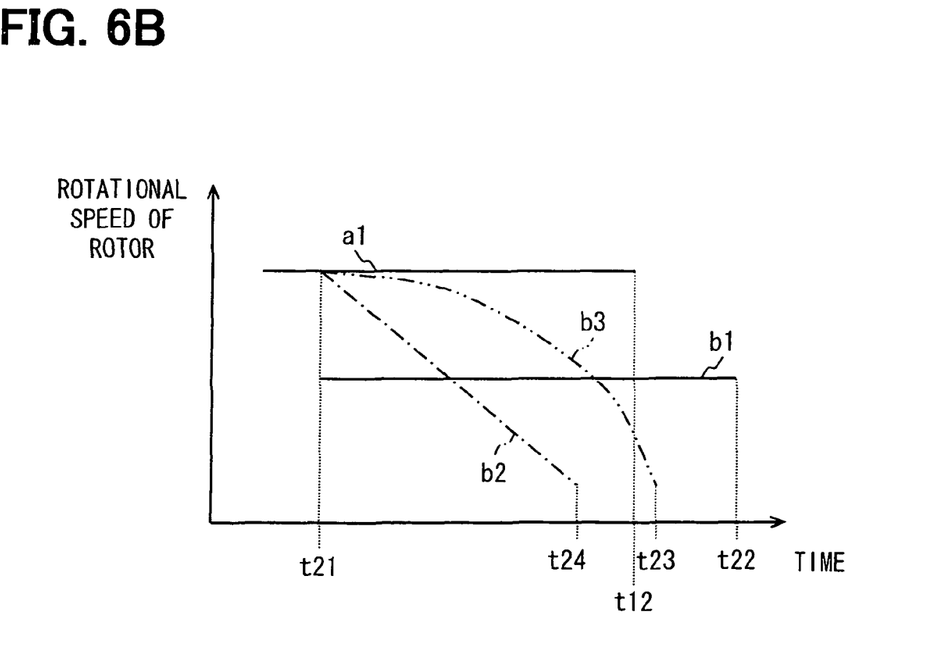

FIG. 6A is a graph showing a relation between the rotational angle of the rotor of the step motor 12 and the time according to the third embodiment of the present invention, while FIG. 6B is a graph showing a relation between the rotational speed of the rotor of the step motor 12 (that is, the changing ratio of the rotational angle with respect to the time) and the time according to the third embodiment. A time point t21 in FIGS. 6A and 6B corresponds to the time point t1 of FIG. 3. Each of time points t22 to t24 in FIGS. 6A and 6B means a time point, at which the rotor of the step motor 12 has reached at the excitation stable point D3, in other words, the electrical degrees of A phase and B phase of the step motor 12 have reached at such electrical degrees corresponding to the excitation stable point D3. In order to compare with FIGS. 5A and 5B, the solid lines A1 and a1 of FIGS. 5A and 5B are respectively indicated in FIGS. 6A and 6B.

As in the same manner to the first and second embodiments, the MPU 13a operates in the following manner. During the period that the ignition switch 5 is turned on (until the ignition switch 5 is turned off), when the command signal (ON signal) is inputted from the display position adjusting switch 14 to the MPU 13a, the motor control unit 13 (more exactly, the MPU 13a) reads out the quadrant of electrical degree of the step motor 12 (which corresponds to the excitation stable point for the current rotor position) from the non-volatile memory device 13c. And so long as the command signal is inputted from the display position adjusting switch 14 to the MPU 13a, the MPU 13a outputs the micro-step driving signal to the driver circuit 13b, so that the step motor 12 is continuously operated. Then, the rotor of the step motor 12 is moved from the excitation stable point, which is read out from the non-volatile memory device 13c and which corresponds to the quadrant of electrical degree of the step motor 12, to the first neighboring excitation stable point. The rotor of the step motor 12 is further moved from the first neighboring excitation stable point to the second neighboring excitation stable point, which is next to the first neighboring excitation stable point. As above the rotor is continuously moved from one excitation stable point to the next excitation stable point, and the rotor is thus rotated.

When the display position adjusting switch 14 is turned off at the time point t21, at which the rotor of the step motor 12 is on the way to the next excitation stable point, the MPU 13a continues to output the micro-step driving signal to the driver circuit 13b by the time point t22, at which the rotor of the step motor 12 reaches at the next excitation stable point D3. In the above operation, the MPU 13a decreases the rotational speed of the rotor of the step motor 12.

More exactly, the MPU 13a decreases the rotational speed of the rotor to a constant speed lower than that at the time point t21, which corresponds to, for example, 60% of the rotational speed of the rotor at the time point t21, as indicated by a solid line b1 in FIG. 6B. And the MPU 13a continuously outputs such micro-step driving signal to the driver circuit 13b by the time point t22, at which the rotor of the step motor 12 reaches at the next excitation stable point D3. In other words, the MPU 13a continuously outputs the micro-step driving signal to the driver circuit 13b at such a time interval, which is longer than that at the time point t21 when the display position adjusting switch 14 is turned off.

When the rotor of the step motor 12 reaches at the excitation stable point D3, the MPU 13a memorizes in the non-volatile memory device 13c the quadrant of electrical degree of the step motor 12 corresponding to the excitation stable point D3.

Since the motor control unit 13 operates the step motor 12 as above, the changing ratio of the rotational angle of the rotor with respect to the time between the time point t21 and the time point t22 is controlled at such a value, which is smaller than that before the time point t21, as shown in FIGS. 6A and 6B. Namely, the rotational speed of the rotor (that is, the changing ratio of the rotational angle) is decreased.

As explained above, according to the third embodiment, the motor control unit 13 continuously drives the step motor 12 until the rotor of the step motor 12 reaches at the next excitation stable point, when the display position adjusting switch 14 is turned off while the ignition switch 5 is in the ON condition. In addition, in the above operation, the rotational speed of the rotor is reduced in the same rotational direction.

As a result that the rotational speed of the rotor of the step motor 12 is reduced in the same rotational direction, when the display position adjusting switch 14 is turned off while the ignition switch 5 is in the ON condition, the image continuously displayed on the windshield may not be instantly displaced, when the display position adjusting switch 14 is turned off. Furthermore, the image continuously displayed on the windshield may not be displaced to an initial position before the display position adjusting switch 14 is turned off. Therefore, even when the rotor of the step motor 12 is continuously moved to the next excitation stable point, an uncomfortable feeling may not be given to eyes of the user (the vehicle driver).

According to the third embodiment, as indicated by the solid line b1 in FIG. 6B, the rotational speed of the rotor of the step motor 12 is decreased to the constant speed, which is lower than the rotational speed of the rotor at the time point when the display position adjusting switch 14 is turned off. The invention should not be limited to this embodiment. For example, as indicated by a one-dot-chain line b2 in FIG. 6B, the rotational speed of the rotor may be gradually reduced with a constant deceleration. Alternatively, as indicated by a two-dot-chain line b3 in FIG. 6B, the rotational speed of the rotor may be reduced in describing a parabolic orbit. As above, the rotational speed of the'rotor may be reduced in any manner in an area which is lower than the rotational speed of the rotor at the time point when the display position adjusting switch 14 is turned off.

(Fourth Embodiment)

According to the above first embodiment, as shown in FIG. 1, the motor control unit 13 continuously drives the step motor 12 until the rotor of the step motor 12 reaches at the next excitation stable point, wherein the rotational speed of the rotor is maintained at the speed corresponding to the rotational speed when the ignition switch 5 is turned off at the time point t2. The rotational direction of the rotor is also maintained in the same direction.

According to a fourth embodiment, the motor control unit 13 carries out not only the control for the step motor 12 but also a control for display brightness of the image. When the ignition switch 5 is turned off, the electric power is continuously supplied in such a manner that the display brightness of the image is gradually decreased.

The fourth embodiment of the present invention will be explained with reference to FIG. 7.

Figure 7:
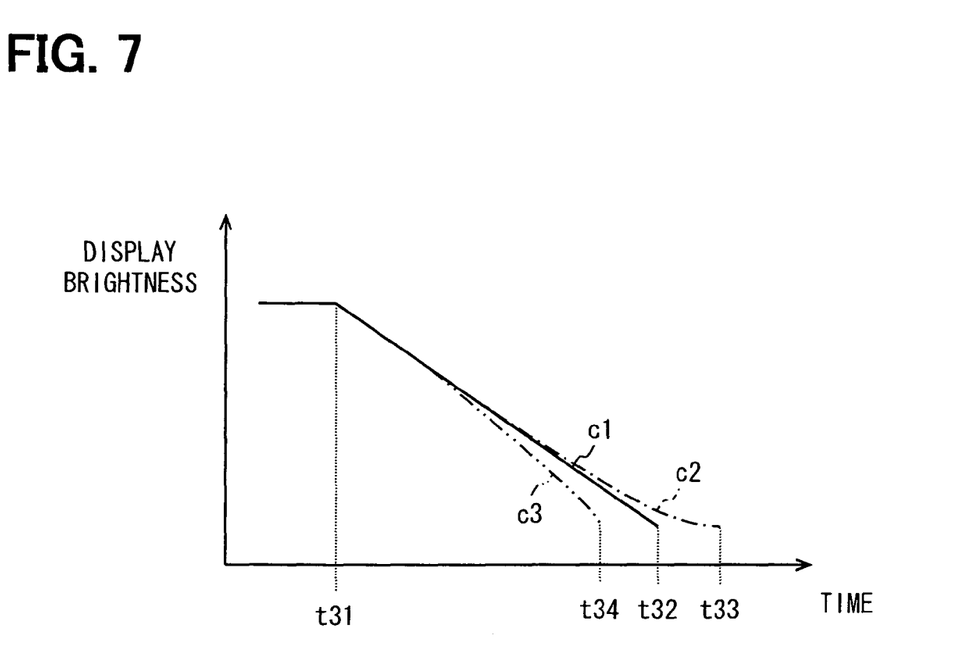
FIG. 7 is a graph showing a relation between a display brightness and a time according to a fourth embodiment of the present invention.

FIG. 7 is a graph showing a relation between a display brightness of the image displayed on the windshield 4 and a time according to the fourth embodiment. A time point t31 in FIG. 7 corresponds to the time point t2 of FIG. 4. Each of time points t32 to t34 in FIG. 7 means a time point, at which the rotor of the step motor 12 has reached at the excitation stable point E3, in other words, the electrical degrees of A phase and B phase of the step motor 12 have reached at such electrical degrees corresponding to the excitation stable point E3.

During the period the ignition switch 5 is turned on (until the ignition switch 5 is turned off), the electrical power is supplied from the battery B to the motor control unit 13 (more exactly, the MPU 13a). The MPU 13a controls not only the brightness of a backlight of the display device 3 but also gradient of each picture element (which forms the image produced by the display device 3) in order to control the display brightness of the image on the windshield 4 at a constant value. Thus, the vehicle driver of the vehicle C can recognize the image on the windshield 4.

The electrical power is continuously supplied from the battery B to the MPU 13a even when the ignition switch 5 is turned off, so that the MPU 13a continuously controls the brightness of the backlight of the display device 3 as well as the gradient of the picture element forming the image produced by the display device 3, in such a manner that the display brightness of the image on the windshield 4 is gradually decreased. According to the present embodiment, the display brightness of the image on the windshield 4 is decreased with a constant changing ratio with respect to the time.

As indicated by a solid line c1 in FIG. 7, the display brightness of the image on the windshield 4 is decreased with the constant changing ratio from a display brightness, which the vehicle driver can recognize with his (or her) eyes, to a display brightness, which the vehicle driver can not recognize with his (or her) eyes. As above the image on the windshield 4 is faded out. As an example for the constant changing ratio, such a value may be preferably used, according to which the display brightness is decreased in five (5) seconds to the brightness, which the vehicle driver can no longer recognize the image displayed on the windshield 4. The invention should not be limited to five seconds, but may be changed to any other values.

As explained above, according to the fourth embodiment, the motor control unit 13 continuously drives the step motor 12 until the rotor of the step motor 12 reaches at the next excitation stable point. In the above operation, the rotational speed of the rotor is maintained at the speed corresponding to the rotational speed when the ignition switch 5 is turned off and the rotational direction of the rotor is also maintained in the same direction.

In addition, the motor control unit 13 carries out not only the control for the step motor 12 but also the control for display brightness of the image. Namely, when the ignition switch 5 is turned off, the electrical power is continuously supplied from the battery B to the motor control unit 13 and the display device 3, so that the display brightness of the image is gradually decreased.

As a result that the display brightness of the image is gradually decreased by the continuous supply of the electrical power when the ignition switch 5 is turned off and the rotational direction is maintained in the same direction, the image displayed on the windshield 4 may not be instantly, displaced during such gradual decrease of the display brightness, or the image displayed on the windshield 4 may not be displaced to the initial position before the ignition switch 5 is turned off. Therefore, even when the rotor of the step motor 12 is continuously moved to the next excitation stable point, an uncomfortable feeling may not be given to eyes of the user (the vehicle driver).

According to the present embodiment, the MPU 13a carries out the control for the brightness of the backlight of the display device 3 but also the control for the gradient of the picture element forming the image produced by the display device 3. It is, however, not always necessary to carry out both of the above controls, but one of the controls may be carried out.

In addition, according to the present embodiment, the display brightness of the image on the windshield 4 is decreased with the constant changing ratio with respect to the time. The invention should not be limited to this embodiment. For example, as indicated by a one-dot-chain line c2 in FIG. 7, the display brightness of the image on the windshield 4 may be decreased in such a manner that an absolute figure of the changing ratio with respect to the time is made smaller as the rotor of the step motor 12 is moved closer to the next excitation stable point E3. Alternatively, as indicated by a two-dot-chain line c3, the display brightness of the image on the windshield 4 may be decreased with such a changing ratio with respect to the time that the absolute figure of the changing ratio becomes larger as the rotor of the step motor 12 is moved closer to the next excitation stable point E3. As above, the display brightness of the image on the windshield 4 may be decreased with any changing ratio, which may be changed with respect to the time.

(Other Modifications)

The present invention should not be limited to the motor control unit 13, according to which display brightness of the image is controlled. For example, a brightness control unit may be separately provided from the motor control unit.

What is claimed is:

1. A vehicle display system comprising:
    a mirror for reflecting an image of a display device so as to display the image on a windshield of a vehicle;
    a step motor having a rotor provided with permanent magnets, the step motor changing a reflecting angle of the mirror when the rotor is rotated;
    a motor control unit for driving the step motor in a micro-step driving manner, wherein a step angle of the step motor is divided into multiple micro step angles so that the rotor of the step motor is rotated by each micro step angle; and
    a display position adjusting switch,
    wherein a display position of the image on the windshield is adjusted when the display position adjusting switch is turned on,
    wherein the step motor as well as the motor control unit is connected to a battery of the vehicle, so that electrical power is continuously supplied to the step motor and the motor control unit, and
    wherein the motor control unit continuously drives the step motor until the rotor of the step motor reaches a next excitation stable point, in a case that the display position adjusting switch or an ignition switch is turned off when the rotor of the step motor is on a way to the next excitation stable point.

2. The vehicle display system according to claim 1, wherein
    the motor control unit maintains a rotational speed of the rotor of the step motor at a speed, which corresponds to a rotational speed of the rotor when the display position adjusting switch or the ignition switch is turned off, until the rotor of the step motor reaches the next excitation stable point, and
    the motor control unit maintains a rotational direction of the rotor of the step motor at a direction equal to that of the rotor at a time point at which the display position adjusting switch of the ignition switch is turned off.

3. The vehicle display system according to claim 2, wherein
    the motor control unit continuously drives the step motor until the rotor of the step motor reaches the next excitation stable point, when the display position adjusting switch is turned off while the ignition switch is in ON condition.

4. The vehicle display system according to claim 2, further comprising:
    a brightness control unit, to which electric power is continuously supplied from the battery when the ignition switch is turned off,
    wherein the brightness control unit gradually decreases display brightness of the image when the ignition switch is turned off.

5. The vehicle display system according to claim 1, wherein
    the motor control unit decreases a rotational speed of the rotor of the step motor when the display position adjusting switch or the ignition switch is turned off, and
    the motor control unit maintains a rotational direction of the rotor of the step motor at a direction equal to that of the rotor at a time point at which the display position adjusting switch or the ignition switch is turned off.

6. A motor control device which is applied to the vehicle display system according to claim 1.

7. The vehicle display system according to claim 1, wherein when the step motor is on the way to the next excitation stable point, the step motor is currently operating such that the reflecting angle of the mirror is currently moving from a previous position to a new position corresponding to the next excitation stable point.

8. A vehicle display system comprising;
    a mirror for reflecting an image of a display device so as to display the image on a windshield of a vehicle;

a step motor having a rotor provided with permanent magnets, the step motor changing a reflecting angle of the mirror when the rotor is rotated;

a motor control unit for outputting a driving signal so as to drive the step motor in a micro-step driving manner, wherein a step angle of the step motor is divided into multiple micro step angles so that the rotor of the step motor is rotated by each micro step angle; and a display position adjusting switch, wherein a display position of the image on the windshield is adjusted when the display position adjusting switch is turned on, wherein the step motor as well as the motor control unit is connected to a battery of the vehicle, so that electrical power is continuously supplied to the step motor and the motor control unit, and wherein the motor control unit continuously outputs the driving signal so as to drive the step motor to an electrical degree of the step motor corresponding to a next excitation stable point, so that the rotor of the step motor reaches the next excitation stable point, in a case that the display position adjusting switch or an ignition switch is turned off when the rotor of the step motor is on a way to the next excitation stable point.

9. The vehicle display system according to claim 8, wherein when the step motor is on the way to the next excitation stable point, the step motor is currently operating such that the reflecting angle of the mirror is currently moving from a previous position to a new position corresponding to the next excitation stable point.

10. A vehicle display system comprising:

a mirror for reflecting an image of a display device so as to display the image on a windshield of a vehicle;

a step motor having a rotor provided with permanent magnets, the step motor changing a reflecting angle of the mirror when the rotor is rotated;

a motor control unit for driving the step motor in a micro-step driving manner, wherein a step angle of the step motor is divided into multiple micro step angles so that the rotor of the step motor is rotated by each micro step angle; and a display position adjusting switch, wherein a display position of the image on the windshield is adjusted when the display position adjusting switch is turned on, wherein the step motor as well as the motor control unit is connected to a battery of the vehicle, so that electrical power is continuously supplied to the step motor and the motor control unit, and wherein the motor control unit continuously drives the step motor until the rotor of the step motor reaches a next excitation stable point, in a case that the display position adjusting switch is turned off when the rotor of the step motor is on a way to the next excitation stable point.

11. The vehicle display system according to claim 10, wherein when the step motor is on the way to the next excitation stable point, the step motor is currently operating such that the reflecting angle of the mirror is currently moving from a previous position to a new position corresponding to the next excitation stable point.

* * * * *